United States Patent
Quigley et al.

(10) Patent No.: US 8,041,351 B2
(45) Date of Patent: *Oct. 18, 2011

(54) ESTABLISHING COMMUNICATION BETWEEN ENTITIES IN A WIRELESS COMMUNICATION SYSTEM

(75) Inventors: Thomas J. Quigley, Franklin, NC (US); Lisa V. Denney, Suwanee, GA (US)

(73) Assignee: Broadcom Corporation, Irvine, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 11/826,127

(22) Filed: Jul. 12, 2007

(65) Prior Publication Data

US 2008/0151823 A1 Jun. 26, 2008

Related U.S. Application Data

(63) Continuation of application No. 11/098,614, filed on Apr. 5, 2005.

(60) Provisional application No. 60/559,359, filed on Apr. 5, 2004.

(51) Int. Cl.
*H04W 4/00* (2009.01)
(52) U.S. Cl. .................................................. 455/434
(58) Field of Classification Search ................... 455/434
See application file for complete search history.

(56) References Cited

U.S. PATENT DOCUMENTS

| | | | |
|---|---|---|---|
| 6,490,727 B1 | 12/2002 | Nazarathy et al. | |
| 6,917,598 B1 * | 7/2005 | Emeott et al. | 370/311 |
| 2002/0036985 A1 * | 3/2002 | Jonas et al. | 370/235 |
| 2003/0002495 A1 | 1/2003 | Shahar et al. | |
| 2004/0163129 A1 | 8/2004 | Chapman et al. | |
| 2004/0181800 A1 * | 9/2004 | Rakib et al. | 725/25 |

\* cited by examiner

*Primary Examiner* — Alexander Jamal
(74) *Attorney, Agent, or Firm* — Sterne, Kessler, Goldstein & Fox P.L.L.C.

(57) ABSTRACT

In a wireless communication system, the time required to establish network connectivity for subscriber stations can be reduced by prioritizing and/or reducing contention between the subscriber stations. The subscriber stations can be divided into acquisition groups and assigned specific uplink channels on which to range. The subscriber stations can randomly or pseudo-randomly range on uplink channels.

15 Claims, 10 Drawing Sheets

ESTABLISHING COMMUNICATION BETWEEN ENTITIES IN A WIRELESS COMMUNICATION SYSTEM

CROSS-REFERENCE TO RELATED APPLICATIONS

This application is a continuation of U.S. patent application Ser. No. 11/098,614 filed Apr. 5, 2005 (pending), which claims the benefit of U.S. Provisional Application No. 60/559,359 filed Apr. 5, 2004 (inactive), both of which are incorporated herein by reference in their entireties.

BACKGROUND OF THE INVENTION

1. Field of the Invention

The present invention relates generally to communication systems, and more specifically to techniques for establishing communication between entities in a wireless communication system.

2. Background

The present invention addresses issues relating to communication systems, and specifically point-to-multipoint communication systems. In conventional point-to-multipoint communication systems, a network supports bidirectional data communication between a central entity and multiple customer premise equipment (CPE). Example point-to-multipoint communication systems include cable modem systems, fixed wireless systems, and satellite communication systems. In each system, the communication path from the central entity to the CPE is typically referred to as the downstream, while the communication path from the CPE to the central entity is typically referred to as the upstream.

One type of point-to-multipoint system is a cable modem system, which typically includes a headend that is capable of communicating with multiple CPE, each of which provides cable modem functionality. In a cable modem system, the CPE can be a cable modem, a settop box, or a cable gateway, to provide some examples.

DOCSIS (Data Over Cable Service Interface Specification) refers to a group of specifications published by Cable-Labs® that define industry standards for cable headend and cable modem equipment. In part, DOCSIS sets forth requirements and objectives for various aspects of cable modem systems including operations support systems, management, data interfaces, as well as network layer, data link layer, and physical layer transport for data over cable systems. The current version of the DOCSIS specification is version 2.0, and includes the DOCSIS Radio Frequency Interface (RFI) Specification SP-RFIv2.0-I03-021218 (hereinafter "DOCSIS RFI Specification"), the entirety of which is incorporated by reference herein.

Conventional DOCSIS-compliant systems use a specific process for CPE joining the network for the first time. In this process, a CPE scans downstream channels, selects a usable downstream channel with an associated usable upstream channel, and attempts to range on the upstream channel using contention slots. Ranging is a DOCSIS-defined protocol by which a CPE establishes communication with the CMTS. A contention slot is a time period during which a CPE is permitted to attempt ranging on a particular channel. Many CPE of the system often contend for the same channel and the same contention slots.

If a CPE loses power after it has successfully joined a network, when power is restored the CPE attempts to reestablish communication with the CMTS in a process that is sometimes referred to as a "cold boot." After power is restored, the CPE initially attempts to range on the upstream and downstream channels the CPE was previously using. Typically, upstream and downstream channels are shared by many CPE. During power outage situations in which many CPE are impacted, the ranging process can take a very long time due to multiple CPE attempting to range on the same upstream and downstream channels. With the expansion of DOCSIS support into various types of CPE, this problem can result in very long time periods for reacquisition.

What is needed, then, is a method and apparatus for establishing communication between entities in a communication system that addresses one or more of the aforementioned shortcomings of conventional communication systems and methods.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Although the embodiments of the invention described herein refer specifically, and by way of example, to cable modem systems, including cable modem termination systems and cable modems, it will be readily apparent to persons skilled in the relevant art(s) that the invention is equally applicable to other communication systems, including but not limited to satellite systems, optical communications systems, telephone wire systems, and/or any combination thereof. It will also be readily apparent to persons skilled in the relevant art(s) that the invention is applicable to any point-to-multipoint system.

Figure 1:
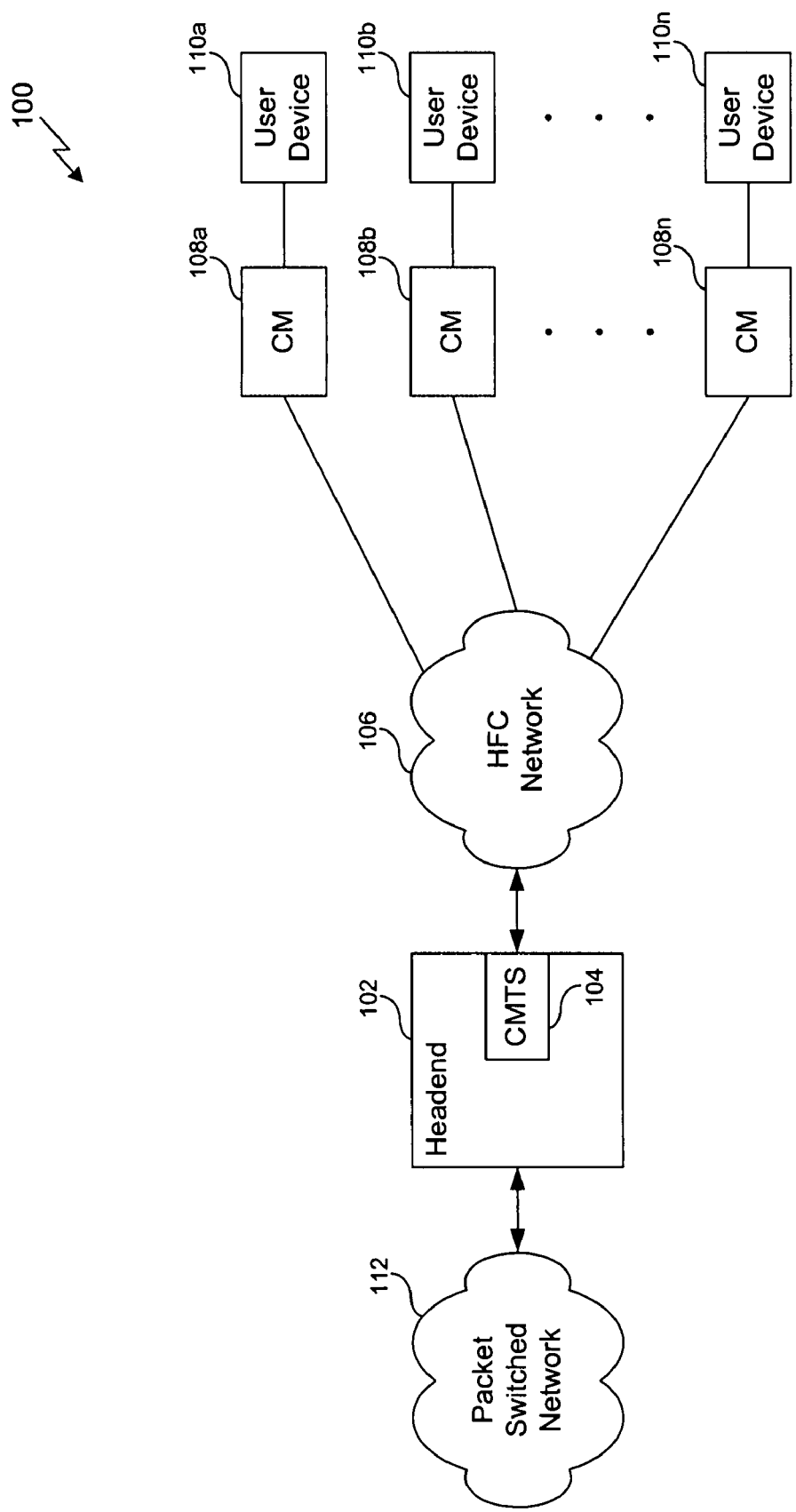
FIG. 1 illustrates a high-level block diagram of an example communication system according to an embodiment of the present invention.

FIG. 1 illustrates a high-level block diagram of an example communication system according to an embodiment of the present invention. The communication system 100 enables voice communications, video, and/or data services based on a bi-directional transfer of packet-based traffic, such as Internet Protocol (IP) traffic, between a cable system headend 102 and a plurality of cable modems 108a-108n via a communications network 106, which, by way of example, may comprise a hybrid fiber coaxial (HFC) network.

The cable headend 102 generally includes at least one cable modem termination system (CMTS) 104. The CMTS 104 is a portion of the cable headend 102 that manages the upstream and downstream transfer of data between the cable headend 102 and the cable modems 108a-108n, which can be located at respective customer premises. The CMTS 104 broadcasts information downstream to the cable modems 108a-108n as a continuous transmitted signal in accordance with a time division multiplexing (TDM) technique. Additionally, the CMTS 104 receives data from the cable modems 108a-108n over a plurality of shared upstream channels. Data from the cable modems 108a-108n is transmitted upstream in accordance with a time domain multiple access (TDMA) technique or a synchronous code division multiple access (S-CDMA) technique.

As shown in FIG. 1, the CMTS 104 further serves as an interface between the HFC network 106 and a packet switched network 112, transferring packets received from the cable modems 108a-108n to the packet switched network 112 and transferring packets received from the packet switched network 112 to the cable modems 108a-108n when appropriate. The packet switched network 112 can include the Internet, for example.

In addition to the CMTS 104, the cable headend 102 can include one or more routers to facilitate the connection between the CMTS 104 and the packet switched network 112, as well as one or more servers for performing necessary network management tasks. The headend can also include one or more satellite receivers, video modulators, and/or telephone switches, to provide other examples.

The HFC network 106 provides a point to multipoint topology for the high speed, reliable, and secure transport of data between the cable headend 102 and the cable modems 108a-108n. As will be appreciated by persons skilled in the relevant art(s), the HFC network 106 can include coaxial cable, fiber optic cable, or a combination of coaxial cable and fiber optic cable linked via one or more fiber nodes, can include frequency translation devices in support of a frequency stacking architecture, and can even include wireless links, for example.

Each of the cable modems 108a-108n operates as an interface between the HFC network 106 and at least one attached user device 110. In particular, the cable modems 108a-108n convert downstream signals received over the HFC network 106 into IP data packets to be received by an attached user device 110. Additionally, the cable modems 108a-108n convert IP data packets received from the attached user device 110 into upstream burst signals suitable for transfer over the HFC network 106.

Referring to FIG. 1, each cable modem 108a-108n is shown supporting only a single user device 110 for the sake of clarity. However, each cable modem 108a-108n is generally capable of supporting a plurality of user devices 110 for communication over the cable modem system 100. A user device 110 can be a personal computer, data terminal equipment, telephony device, broadband media player, network controlled appliance, or any other device capable of transmitting or receiving data over a packet switched network.

In an embodiment, cable modems 108a-108n and CMTS 104 represent DOCSIS-compliant cable modem equipment. In other words, cable modems 108a-108n and CMTS 104 are adapted to communicate in accordance with protocols and/or formats provided in the DOCSIS specification.

Figure 2:
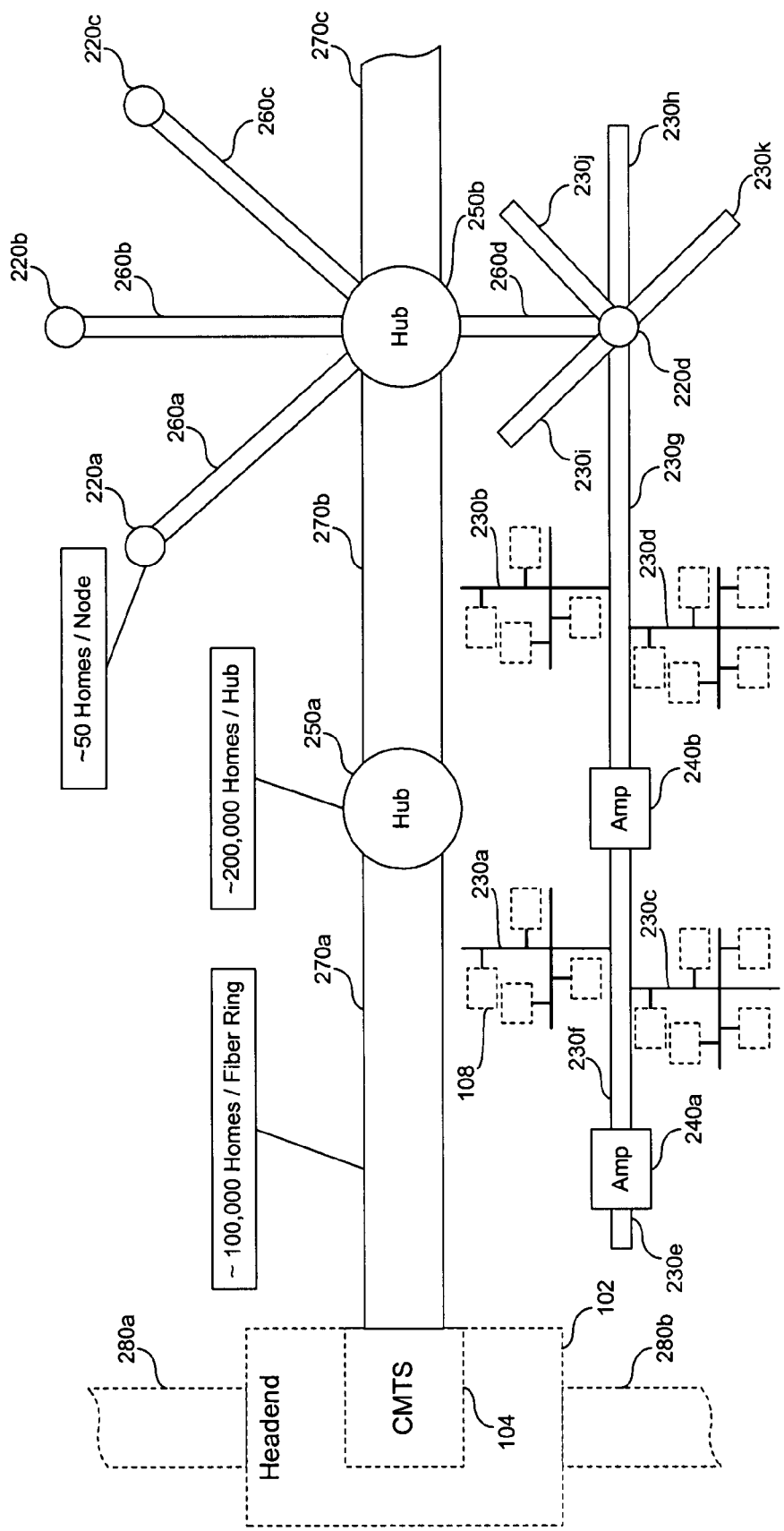
FIG. 2 illustrates a schematic diagram of an example hybrid fiber coaxial (HFC) network showing typical pathways for data transmissions between a headend and a plurality of cable modems according to an embodiment of the present invention.

FIG. 2 illustrates a schematic diagram of an example hybrid fiber coaxial (HFC) network to facilitate transmission of data between a headend and a plurality of cable modems according to an embodiment of the present invention. For example, an HFC network 106 is often used by a cable provider to provide Internet access, cable television, and/or pay-per-view programming to subscribers.

In FIG. 2, approximately 500 cable modems 108 are in electrical communication with each node 220 of the HFC network 106 for illustrative purposes. Cable modems 108 are typically connected to a node 220 via coaxial cables 230. The HFC network 106 can include amplifiers 240 to facilitate the electrical connection of the more distant cable modems 108, for example, to the nodes 220. Amplifying the electrical signals can desirably enhance the signal-to-noise ratio (SNR) of communications between the headend 102 and the cable modems 108. Coaxial cables 230a-230d electrically connect the cable modems 108 with coaxial cables 230f, 230g, which extend between amplifiers 240 and nodes 220.

Each node 220 is electrically connected to a hub 250, typically via an optical fiber 260. The hubs 250 are in communication with the headend 102 via optical fibers 270. Each hub 250 is generally capable of facilitating communication with 20,000 cable modems 108.

The optical fibers 270 extending intermediate the headend 102 and each hub 250 define a fiber ring, which is typically capable of facilitating communication between approximately 100,000 cable modems 108 and the headend 102. The headend 102 can communicate via transmission line 280 with the Internet, another headend, and/or any other suitable device(s) or network. The transmission line 280 can be a T1 line or a T2 line, to provide some examples.

Figure 3:
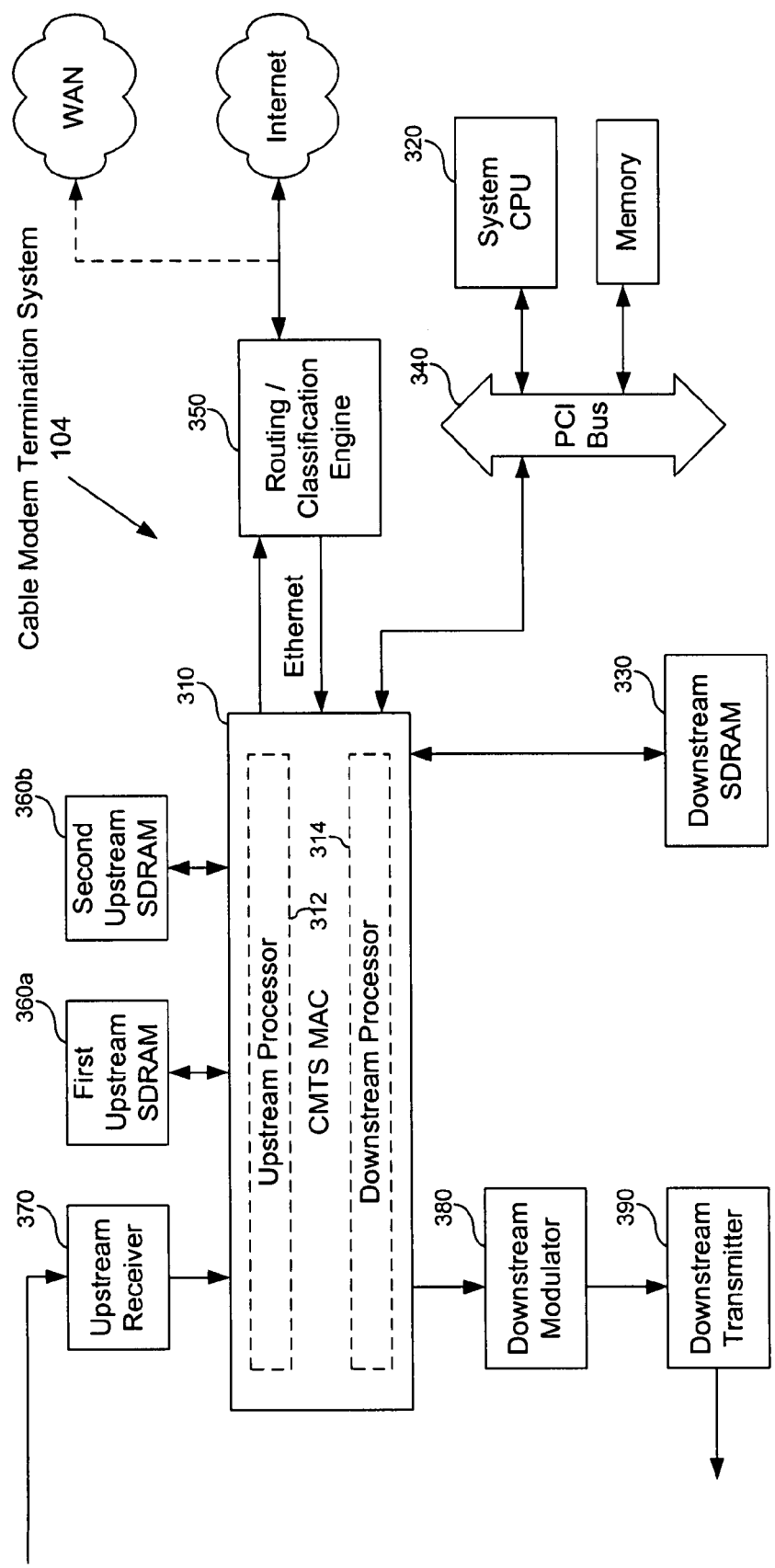
FIG. 3 illustrates a block diagram of an example cable modem termination system (CMTS) according to an embodiment of the present invention.

FIG. 3 illustrates a block diagram of an exemplary implementation of a CMTS 104 of the communication system 100. This exemplary implementation is presented by way of example, and is not intended to limit the scope of the present invention. The CMTS 104 processes signals both at a physical (PHY) layer and at a media access control (MAC) layer. The CMTS 104 includes a CMTS MAC 310, which provides hardware support for MAC layer per-packet functions, such as fragmentation, concatenation, and payload header suppression. Providing such support reduces the amount of processing required of a system central processing unit (CPU) 320, which serves to improve the overall performance of the CMTS 104.

An upstream processor 312 of the CMTS MAC 310 performs data encryption standard (DES) decryption, fragment reassembly, de-concatenation, payload packet expansion, packet acceleration, upstream management information base (MIB) statistic gathering, and/or priority queuing for the resultant packets. Each output queue is independently configured to provide packets to a personal computer interface (PCI) or a gigabit media independent interface (GMII) (not shown).

A downstream processor 314 of the CMTS MAC 310 accepts packets from priority queues and performs payload header suppression, DOCSIS header creation, DES encryption, cyclic redundancy checking (CRC), header check sequence creation in accordance with the DOCSIS specification, Moving Pictures Experts Group (MPEG) encapsulation, and/or multiplexing. In an embodiment, a downstream synchronous dynamic random access memory SDRAM 330 is used to support packaging, handling, and storage of output queues received from the CMTS MAC 310.

In an embodiment, the CMTS MAC 310 is configured and managed externally via a PCI interface (not shown) and a PCI bus 340. Alternatively, the CMTS MAC 310 can be operated remotely using a routing/classification engine 350 that is located externally to the CMTS MAC 310.

According to an embodiment, first and second upstream SDRAMs 360 are used to minimize latency on the internal buses. For example, in an embodiment, the first upstream SDRAM 360a is operable to support keys and reassembly, and the second upstream SDRAM 360b is operable to support packet header suppression (PHS) and output queues.

A Serial Peripheral Interface (SPI) master port (not shown) is employed to control the interface between MAC layer components and PHY layer components. For example, the SPI master port can be used to control the interface between the CMTS MAC 310 and the upstream receiver 370 and/or between the CMTS MAC 310 and the downstream modulator 380.

The CMTS MAC 310 generates data which is modulated and then transmitted to one or more cable modems 108. For example, data generated by CMTS MAC 310 can be modulated onto a carrier signal by downstream modulator 380 and then transmitted downstream by downstream transmitter 390. The upstream receiver 370 receives information from the cable modems 108 in bursts of TDMA- or S-CDMA-encoded packets.

In certain situations, such as upon initial power up or after a power loss, multiple cable modems 108 can attempt to transmit their packets to the CMTS 104 at the same time. As is known in the art, the CMTS 104 can utilize a backoff window to mitigate competition between cable modems 108.

A backoff window represents a number of ranging opportunities a cable modem 108 waits before attempting to range on a channel. The CMTS 104 generally transmits an initial backoff value and a final backoff value to one or more cable modems 108 in an upstream channel descriptor (UCD) message. Each backoff value equals two raised to an integer power. For illustrative purposes, the initial backoff value can be $2^2=4$, and the final backoff value can be $2^4=16$.

According to a first embodiment, the first time the cable modem 108 attempts to range, the cable modem 108 picks a random number in the range represented by the initial backoff value. For example, if the initial backoff value is 4, the cable modem 108 picks a random number in the range of 1 through 4. In a second embodiment, the CMTS 104 assigns the random number to the cable modem 108.

The cable modem 108 waits a number of ranging opportunities equal to the random number and then attempts to range. If the cable modem 108 does not receive a ranging response from the CMTS 104 within a specified time, then the cable modem 108 increases the backoff window.

For example, if the initial backoff window is $2^2=4$, based on the initial backoff value, then the backoff window becomes $2^3=8$ and the new range becomes 1 through 8. In the first embodiment, the cable modem 108 picks a random number in the range of 1 through 8 and waits that many contention slots or ranging opportunities before attempting to range. In the second embodiment, the CMTS 104 assigns the random number in the range of 1 through 8 to the cable modem 108. Every time the cable modem 108 sends a ranging request and receives no ranging response before the specified time limit, the cable modem 108 increases the backoff window until the final backoff value is reached.

If the final backoff value is reached, then the backoff window is not further incremented. Instead, the cable modem 108 continues to pick, or the CMTS 104 continues to assign, a random number in the range of 1 through the final backoff value. With respect to the first embodiment, for example, if both the backoff window and the final backoff value are $2^4=16$, the cable modem 108 does not increment the backoff window to become $2^5=32$ in response to a collision. Instead, the cable modem 108 selects a random number in the range of 1 through 16 and waits that number of ranging slots to transmit its ranging request.

This process continues until the cable modem 108 receives a ranging response message from the CMTS 104 or until the cable modem 108 reaches a retry threshold. If the cable modem 108 reaches a specified retry threshold, the cable modem 108 restarts the cold boot process from the beginning.

The use of a backoff window can be combined with grouping and/or prioritizing the cable modems 108 to facilitate communication between the CMTS 104 and the cable modems 108. For instance, the CMTS 104 can group the cable modems 108 and then assign the cable modems 108 to time slots using a backoff window. A different backoff window can be used for each group or priority of the cable modems 108.

The CMTS 104 generally does not know the address or any other identifier of a cable modem 108 until the CMTS 104 receives a transmission from the cable modem 108. Thus, a cable modem 108 typically vies for a contention slot if the CMTS 104 has not received the address or some other identifier of the cable modem 108.

The CMTS 104 can switch a cable modem 108 out of contention upon receipt of a transmission from the cable modem 108. For example, the CMTS 104 can provide unicast opportunities to the cable modem 108 as soon as the first transmission of the cable modem 108 is received by the CMTS 104. Unicast (also referred to as "station maintenance") allows a cable modem 108 to be assigned a particular time slot, and no other cable modem 108 is permitted to compete with the cable modem 108 for that slot. For instance, if the CMTS 104 assigns a unicast time slot to a cable modem 108, then no other cable modem 108 transmits in that time slot.

Upon receipt of a transmission from a cable modem 108, the CMTS 104 can assign a service identifier (SID) to the cable modem 108. The cable modem 108 typically sends a ranging request to the CMTS 104. The ranging request often includes a request for the CMTS 104 to assign a SID to the cable modem 108. Upon receipt of this request, the CMTS 108 assigns a SID to the cable modem 108. Because the CMTS 104 can generally change the SID that is initially assigned to the cable modem 108, the SID initially assigned to the cable modem 108 by the CMTS 104 is sometimes referred to as a temporary SID.

The CMTS 104 generally assigns the SID to the cable modem 108 by sending a "ranging response message" to the cable modem 108. The ranging response message can include the original full address of the cable modem. The temporary SID can be a 14-bit address, for example, and typically enables the CMTS 104 to address the cable modem 108 in a bandwidth allocation message.

The CMTS 104 can generate the SID based on the MAC address of the cable modem 108. The MAC address of the cable modem 108 is traditionally a 48-bit value. The SID generally has fewer than 48-bits, though the SID can include any suitable number of bits. For instance, the SID can be a 14-bit value. The CMTS 104 can use a SID having fewer bits than the MAC address of the cable modem 108 to identify the cable modem 108 to conserve bandwidth in accordance with an embodiment. For example, using the SID can reduce bandwidth requirements for a communication system 100.

A memory can store a lookup table that includes the MAC addresses of the cable modems 108. For example, the CMTS 104 can associate a SID of a cable modem 108 with an address of the lookup table that includes the MAC address of the cable modem 108. In an embodiment, the SIDs are addresses of the lookup table, corresponding to MAC addresses of the cable modems 108. For example, a CMTS 104 can determine the MAC address of a cable modem 108 by using the SID that is associated with that cable modem 108.

The DOCSIS specification uses several types of SIDs: unicast, multicast, and broadcast. The multicast and broadcast SIDs are "well known" to each cable modem 108 and are defined in the DOCSIS RFI Specification. A broadcast SID addresses all cable modems 108. A multicast SID is associated with more than one cable modem 108. For instance, a multicast SID can indicate a range of addresses of the lookup table or an address of the lookup table that corresponds to multiple MAC addresses. The CMTS 104 can assign a multicast SID or a broadcast SID to a particular time slot, so that cable modems 108 can contend for transmission in that slot. On the other hand, if the CMTS 104 assigns the time slot to a unicast SID, then only one cable modem 108 can transmit in the allocated time.

Figure 4:
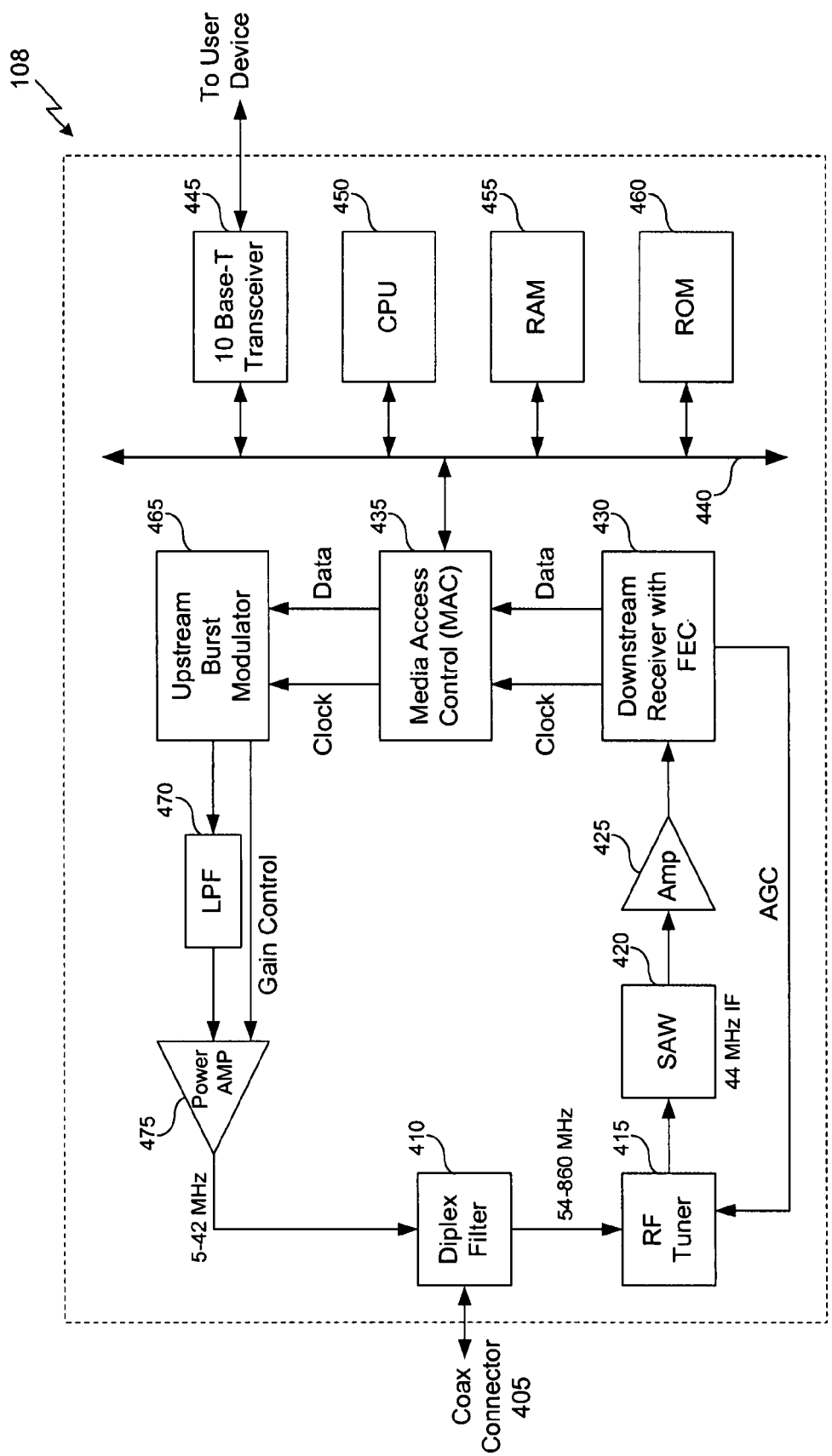
FIG. 4 illustrates a schematic block diagram of an implementation of a cable modem according to an embodiment of the present invention.

FIG. 4 illustrates a schematic block diagram of an exemplary implementation of a cable modem 108 of the communication system 100. This exemplary implementation is presented by way of example, and is not intended to limit the present invention. The cable modem 108 is configured to receive and transmit signals to and from the HFC network 106 via coaxial connector 405. Accordingly, the cable modem 108 will be described in terms of a receiver portion and a transmitter portion.

The receiver portion includes a diplex filter 410, a radio frequency (RF) tuner 415, a surface acoustic wave (SAW) filter 420, an amplifier 425, and a downstream receiver 430. Reception begins with the diplex filter 410 receiving a downstream signal originating from the CMTS 104. The diplex filter isolates the downstream signal and routes the signal to the RF tuner 415. In an embodiment, the downstream signal has spectral characteristics in the frequency range of approximately 54-860 MHz. The RF tuner 415 downconverts the signal and provides the downconverted signal to the SAW filter 420, which passes only spectral components of the downconverted signal that are within a particular bandwidth. The amplifier 425 amplifies the filtered signal and passes it to the downstream receiver 430. Automatic gain controls can be provided from the downstream receiver 430 to the RF tuner 415.

The downstream receiver 430 demodulates the amplified signal. For example, the downstream receiver 430 can demodulate the amplified signal in accordance with a quadrature amplitude modulation (QAM) technique, such as 64-QAM or 256-QAM, to recover the underlying information signal. The downstream receiver 430 also converts the underlying information signal from an analog form to digital form. The downstream receiver 430 then provides the digitized underlying information to a media access control (MAC) 435.

The MAC 435 processes the digital data, which may include, for example, Ethernet packets for transfer to an attached user device. The functions of the MAC 435 can be implemented in hardware or in software. In the example implementation of FIG. 4, the functions of the MAC 435 are implemented in both hardware and software. The random access memory (RAM) 455 and/or the read-only memory (ROM) 460 can store software functions of the MAC 435. The CPU 450 can execute the software functions of the MAC 435. The MAC 435 is in electrical communication with the CPU 450, the RAM 455, and the ROM 460 via a shared communications medium 440. The shared communications medium can include a computer bus or a multiple access data network, to provide some examples.

Referring to FIG. 4, the MAC 435 is further in electrical communication with an Ethernet interface 445 via the shared communications medium 440. When appropriate, the MAC 435 can transfer Ethernet packets received from the downstream receiver 430 to the Ethernet interface 445 for transfer to an attached user device.

The transmitter portion of the cable modem 108 includes an upstream burst modulator 465, a low pass filter 470, a power amplifier 475, and the diplex filter 410. Transmission begins with the MAC 435 receiving a data packet. The data packet can include data originally received from an attached user device via the Ethernet interface 445, for example. In another example, the data packet can be generated by the MAC 435 as part of the cable modem network management and upkeep. The MAC 435 formats the data packet in compliance with the protocols set forth in the DOCSIS specification. The MAC 435 provides the data packet to the upstream burst modulator 465, which converts the data packet into analog form and modulates the data packet onto a carrier signal in accordance with a particular modulation technique. The modulation technique can include, without limitation, a Quadrature Phase Shift Key (QPSK) technique, an 8-QAM technique, a 16-QAM technique, a 32-QAM technique, or a 64-QAM technique, to provide some examples.

The upstream burst modulator 465 provides the modulated carrier signal to the low pass filter (LPF) 470, which generally passes signals with spectral characteristics in a desired bandwidth within the frequency range of approximately 5-42 MHz. The power amplifier 475 amplifies the filtered signal received from the LPF 470 and provides the amplified signal to the diplex filter 410. The upstream burst modulator 465 typically regulates the gain of the power amplifier 475. The diplex filter 410 isolates the amplified signal and transmits the amplified signal upstream over the HFC network 106 during a scheduled burst opportunity.

Figure 5:
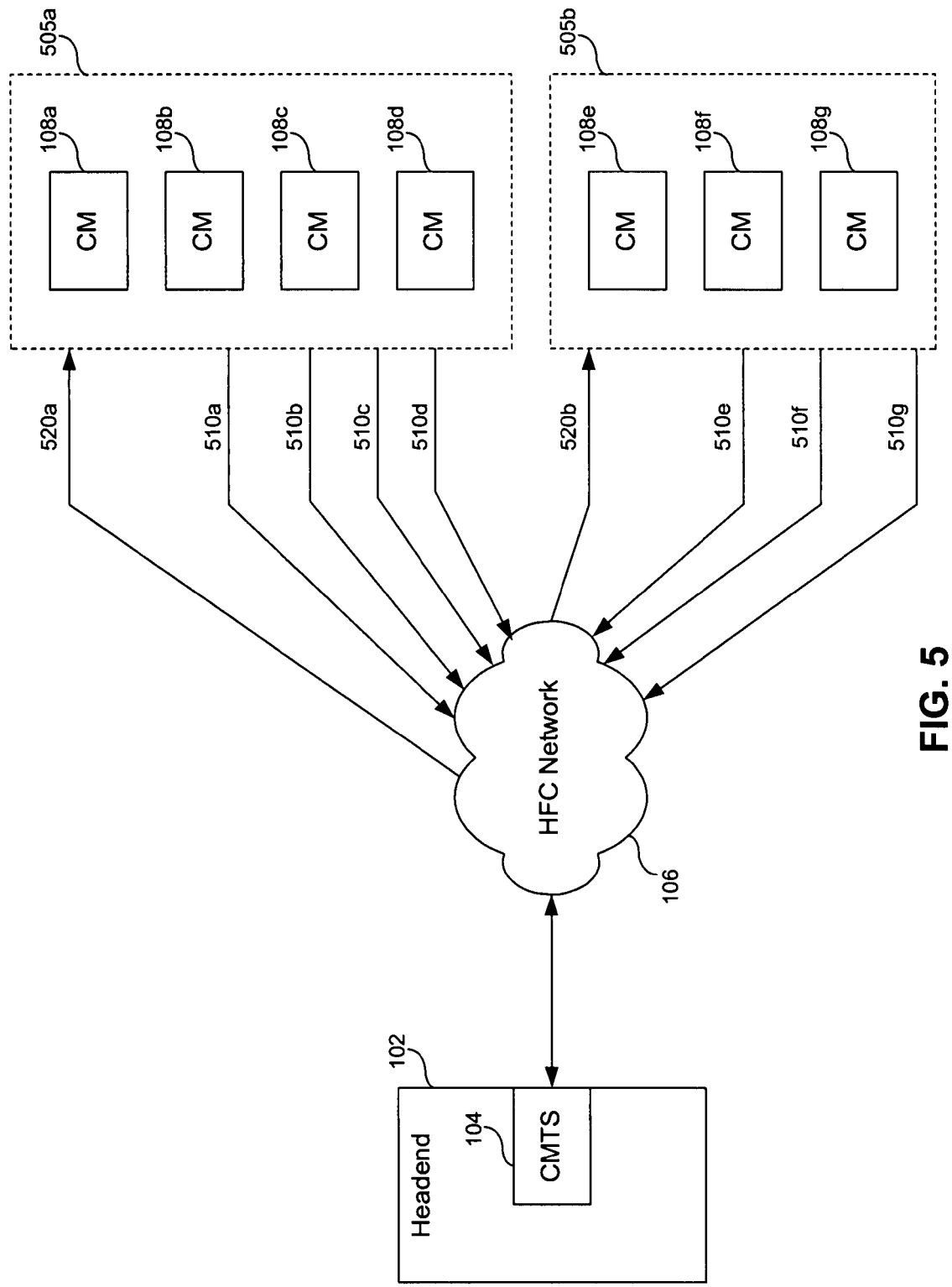
FIG. 5 illustrates a high-level block diagram of an example communication system in which cable modems are grouped according to an embodiment of the present invention.

FIG. 5 illustrates a high-level block diagram of an example communication system in which cable modems are grouped according to an embodiment of the present invention. For example, the CMTS 104 can assign the cable modems 108 to particular acquisition groups 505 at initial power-up. Information associated with the acquisition groups 505 can be used in response to a loss of power.

At initial power-up, a cable modem 108 generally attempts to lock onto a downstream signal. Once the cable modem 108 successfully finds a DOCSIS downstream signal, for example, the cable modem 108 reads the upstream channel descriptor (UCD) messages included in the downstream signal received from the CMTS 104. The cable modem 108 can determine, based on the UCD messages, which of the upstream channels 510 the cable modem 108 is capable of using. For instance, if the cable modem 108 is capable of supporting only the DOCSIS 1.0 standard, and an upstream channel requires a DOCSIS 2.0 capability, then the cable modem 108 can remove that upstream channel from its list of available upstream channels.

According to an embodiment, the CMTS 104 assigns the cable modems 108 to the acquisition groups 505 during the registration process. Should the cable modem 108 lose power for any reason and need to reacquire communication with the CMTS 104, the cable modem 108 uses the acquisition group information previously stored to assist in the acquisition process. The acquisition group information can be used to assist in downstream channel acquisition by instructing the cable modem 108 as to which downstream channel or set of downstream channels to use, thereby reducing the number of cable modems 108 competing to lock onto a particular downstream signal. In an embodiment, the CMTS 104 uses the UCD messages to provide information regarding the upstream to acquisition groups 505.

Referring to FIG. 5, the CMTS 104 divides the cable modems 108 into acquisition groups 505 and assigns the cable modems 108 specific upstream channels 510 on which to range in the event of a power outage. For example, the CMTS 104 can configure cable modems 108 assigned to the first acquisition group 505a to range on upstream channels 510a-510d and cable modems assigned to the second acquisition group 505b to range on upstream channels 510e-510g. The CMTS 104 can enable the cable modems 108a-108d in the first acquisition group 505a to range on any of the upstream channels 510a-510d associated with the first acquisition group 505a. The CMTS 104 can enable the cable modems 108e-108g in the second acquisition group 505b to range on any of the upstream channels 510e-510g associated with the second acquisition group 505b. In an embodiment, the CMTS 104 divides the cable modems 108 into the acquisition groups 505 based on their current respective upstream channels 510, the possible upstream channels 510 available, and/or the priority assigned to each cable modem 108 based on its service offering.

The CMTS 104 can base the priority of a cable modem 108 on the service(s) provided by the cable modem 108 or how the cable modem 108 fits into a specific hierarchy for Small Office/Home Office (SOHO) applications, to provide some examples. For instance, the CMTS 104 can assign cable modems 108 providing primary line phone service a higher priority than cable modems providing meter-reading functions. In a SOHO application, for example, the CMTS 104 can give a CPE of one user preference over a CPE of another user. For example, the CMTS 108 can give a cable modem 108 of a parent working from home a higher priority than the a cable modem 108 of a child, which is used only for gaming applications.

According to a first embodiment, an acquisition group 505 can include cable modems 108 having a particular priority. For example, the CMTS 104 can assign cable modems 108 having a first priority to the first acquisition group 505a, cable modems 108 having a second priority to the second acquisition group 505b, and so on. In a second embodiment, the CMTS 104 can spread cable modems 108 having the same or similar priorities over multiple acquisition groups 505.

The CMTS 104 can assign upstream channels 510 such that cable modems 108 with similar priorities are spread over multiple upstream channels 510. The upstream channels 510 can be associated with one or more acquisition groups 505. For example, once the CMTS 104 divides the cable modems 108 into acquisition groups 505, cable modems 108 having the same priority in a particular group 505 can be assigned such that no upstream channel 510 of the group 505 is used by substantially more cable modems 108 having the same priority than other upstream channels 510 of the group 505.

According to an embodiment, the CMTS 104 can randomly or pseudo-randomly assign cable modems 108 of a particular group 505 upstream channels 510. In an embodiment, cable modems 108 of a group 505 can be assigned upstream channels 510 based on MAC addresses of the cable modems 108. For instance, the MAC addresses can be used to pseudo-randomly assign the upstream channels 510 to the cable modems 108. Pseudo-random generally means not entirely random. For example, the CMTS 104 can generate a pseudo-random number by performing an algorithm, such as a hash algorithm, on the MAC address of a cable modem 108. The pseudo-random number in this example is not generated entirely randomly (e.g., by chance) because it is based on a known value, the MAC address of the cable modem 108. According to an embodiment, the CMTS 104 uses the MAC address of a cable modem 108 to generate a pseudo-random value corresponding to an upstream channel 510.

An acquisition group 505 can be divided into sub-groups. For example, the headend 102 can assign a cable modem 108 to a particular sub-group of the acquisition group 505. A message can be sent from the headend 102 to a cable modem 108 to notify the cable modem 108 of the acquisition group 505, the sub-group, the upstream channel 510, and/or the priority assigned to the cable modem 108. For example, the headend 102 can transmit such information in a registration response message to the cable modem 108.

The CMTS 104 can be configured to delay the ranging process of a cable modem 108 after power-up. For example, the CMTS 108 can delay allowing the cable modem 108 to range, based on a service provided by the cable modem 108 or a priority assigned to the cable modem 108. In an embodiment, the cable modem 108 can provide such information (e.g., service information or priority information) to the CMTS 104 using an upstream burst.

For example, the CMTS 104 can delay data transmissions in favor of voice transmissions. The CMTS 104 can allow cable modems 108 handling the voice transmissions to range before the cable modems 108 handling the data transmissions. The delay can be fixed or provided in real-time via downstream messages originating at the CMTS 104, for example. According to an embodiment, the CMTS 104 can retrieve a predetermined delay from a memory in the communication system 100.

In an embodiment, the CMTS 104 can configure the cable modems 108 such that each cable modem 108 having the highest priority (e.g., level one) selects an upstream channel 510 and attempts to range immediately upon power-up. The CMTS 104 can define all other priority settings to mean "wait for instructions". This can allow higher priority cable modems 108 to range much more quickly, due to the reduced contention between the cable modems 108.

The number of collisions between cable modems 108, or the number of cable modems 108 or acquisition groups 505 experiencing a collision, can be monitored by the CMTS 104, for example. A memory can store a value representing the number of collisions that occur within a predetermined period of time. The CMTS 104 can increment the value stored in the memory upon detection of a collision. According to an embodiment, if the headend 102 detects that the value has gone below a predetermined threshold, the headend 102 can assume that most of the high priority cable modems 108 have successfully ranged. The headend 102 can send a broadcast downstream message informing cable modems 108 that the next highest priority level (e.g., level two) can attempt to range. This process generally continues until all cable modems 108 have successfully ranged.

Figure 6:
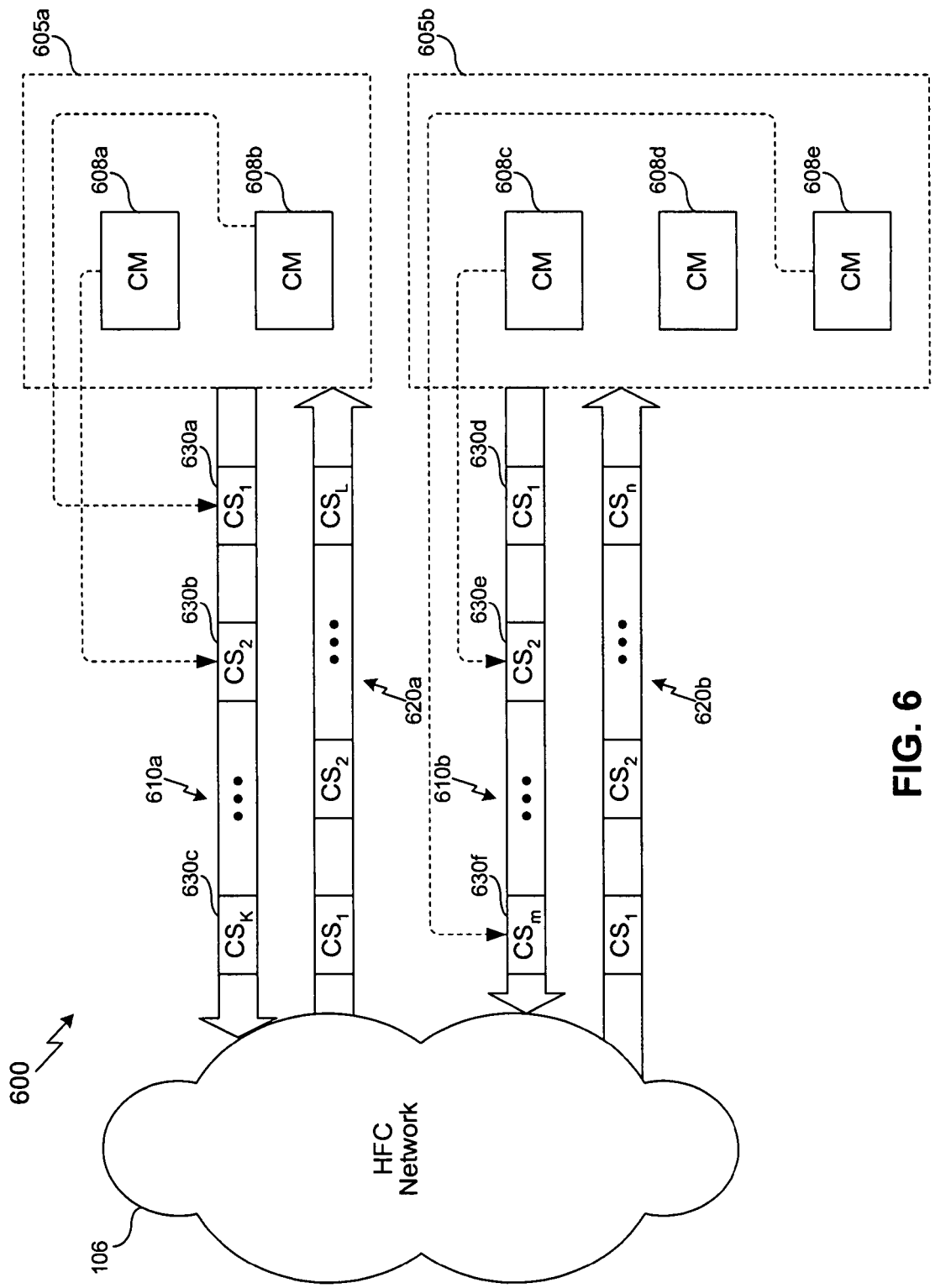
FIG. 6 illustrates contention slots associated with upstream and downstream channels of a communication system according to an embodiment of the present invention.

FIG. 6 illustrates contention slots associated with upstream and downstream channels of a communication system. Cable modems 108 generally attempt to range using one or more contention slots of a particular channel 610, 620. Multiple cable modems 608 can range on the same upstream channel

610. For example, the CMTS 104 can group cable modems 608 according to the upstream channel 610 on which the cable modems 108 are to range. In the embodiment of FIG. 6, the CMTS 104 separates cable modems 608 into groups 605. The CMTS 104 can configure cable modems 608*a*, 608*b* of the first group 605*a* to range on the first upstream channel 610*a* and cable modems 608*c*-608*e* of the second group 605*b* to range on the second upstream channel 610*b*.

The CMTS 104 can group a cable modem 608 based on the current upstream channel 610 of the cable modem 108, the possible upstream channels 610 available, a service provided by the cable modem 608, or a priority assigned to the cable modem 608. The CMTS can assign cable modems 608 having the same or similar priorities to the same group 605 or spread the cable modems 108 over multiple groups 605.

According to an embodiment, once the CMTS 104 configures cable modems 608 to range on particular upstream channel(s) 610, the CMTS 104 can assign the cable modems 608 certain contention slots 630 associated with the upstream channel(s) 610 on which the cable modems 108 are to range. Referring to FIG. 6, the CMTS 104 assigns contention slot 630*b* to cable modem 608*a*, contention slot 630*a* to cable modem 608*b*, contention slot 630*e* to cable modem 608*c*, and contention slot 630*f* to cable modem 608*e*.

Figure 7:
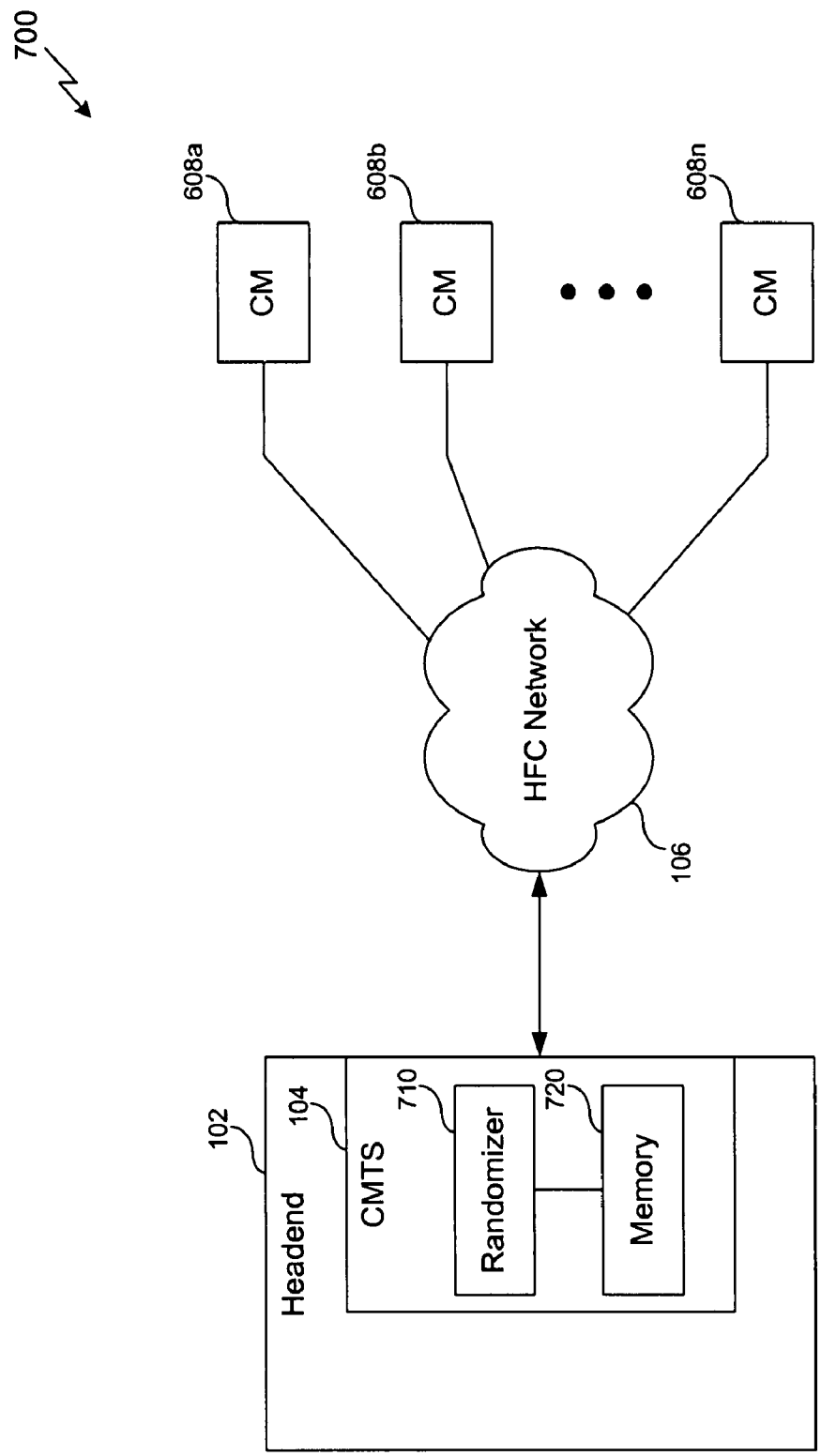
FIG. 7 illustrates a high-level block diagram of an example communication system including a randomizer according to an embodiment of the present invention.

The CMTS 104 can randomly or pseudo-randomly assign contention slots 630 to the cable modems 608. Referring to FIG. 7, a randomizer 710 can be used to generate a random or pseudo-random value corresponding with a contention slot 630. For example, the pseudo-random value can be based on a MAC address of the cable modem 608. According to an embodiment, the randomizer 710 performs an algorithm, such as a hash algorithm, using the MAC address to generate a value indicating how many ranging opportunities the cable modem 608 is to wait before attempting to range. Memory 720 can store the value.

As shown in FIG. 7, the randomizer 710 is incorporated in CMTS 104. However, the randomizer can also be implemented in one or more of the cable modems 608. The randomizer 710 can be implemented in software or hardware. Referring back to FIG. 5, the randomizer 710 can be used to randomly or pseudo-randomly assign cable modems 108 to upstream channels 610 of an acquisition group 505.

The cable modem 108 generally attempts to range on a single channel 510, 520 until the cable modem 108 determines a success or a failure. If the cable modem 108 detects a failure, then the cable modem 108 can attempt to range on a different channel 510, 520. The DOCSIS specification sets forth an iterative process by which a cable modem 108 can increase its output power to facilitate detection by the CMTS 104. For example, the cable modem 108 might not initially transmit at a high enough power for the CMTS 104 to sense transmissions of the cable modem 108.

The CMTS 104 can configure a cable modem 108 to range on a particular group of upstream channels 510 or a particular group of time slots. For example, the CMTS 104 can assign the cable modem 108 to a particular group of upstream channels 510, and the cable modem 108 can then select an upstream channel 510 from the group on which to range. According to an embodiment, the CMTS 104 can configure the cable modems 108 such that a first cable modem 108*a* ranges on a first group of upstream channels 510 and a second cable modem 108*b* ranges on a second group of upstream channels 510. For instance, the CMTS 104 can configure the first cable modem 108*a* such that the first cable modem 108*a* ranges on an upstream channel of the first group after a power outage. The CMTS 104 can configure the second cable modem 108*b* such that the second cable modem 108*b* ranges on an upstream channel of the second group after the power outage.

The cable modem 108 can determine which upstream channel 510, 610 to use for ranging based on a group 505, 605 or priority with which the cable modem 108 or the upstream channel 510, 610 is associated. For example, the headend 102 can provide this information to the cable modem 108 in a downstream message.

Figure 8:
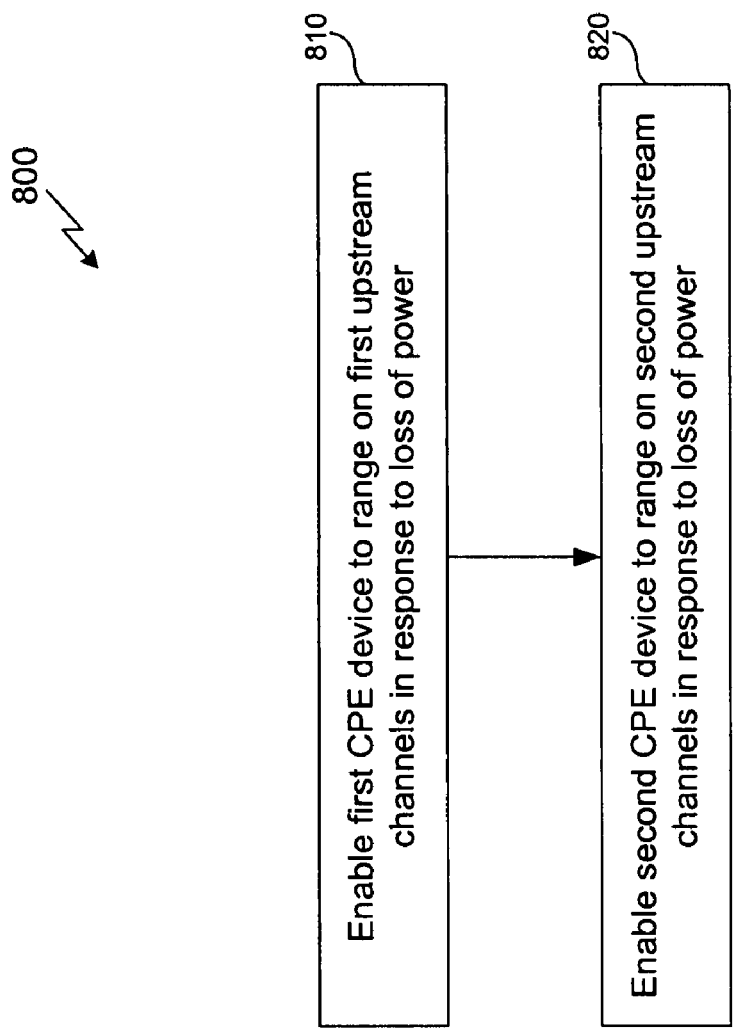
FIG. 8 illustrates a flow chart of a method for enabling CPE devices to range according to an embodiment of the present invention.
Figure 9:
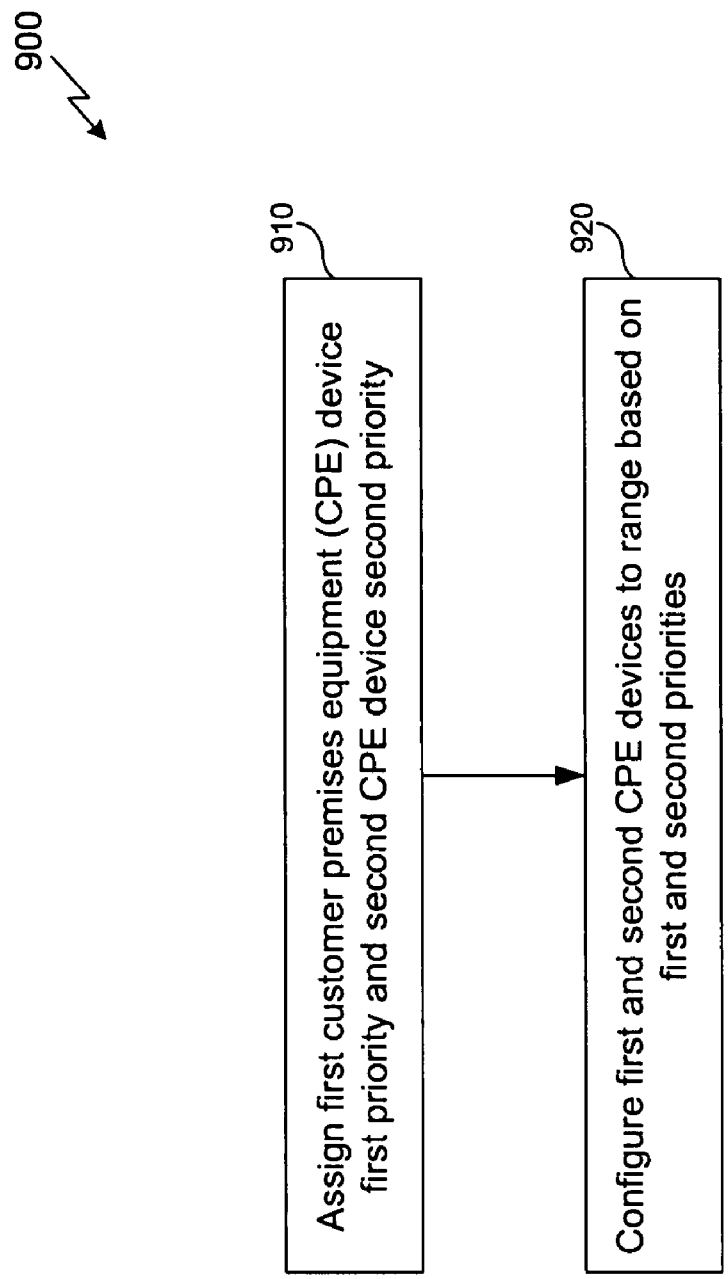
FIG. 9 illustrates a flow chart of a method for configuring CPE devices to range according to an embodiment of the present invention.
Figure 10:
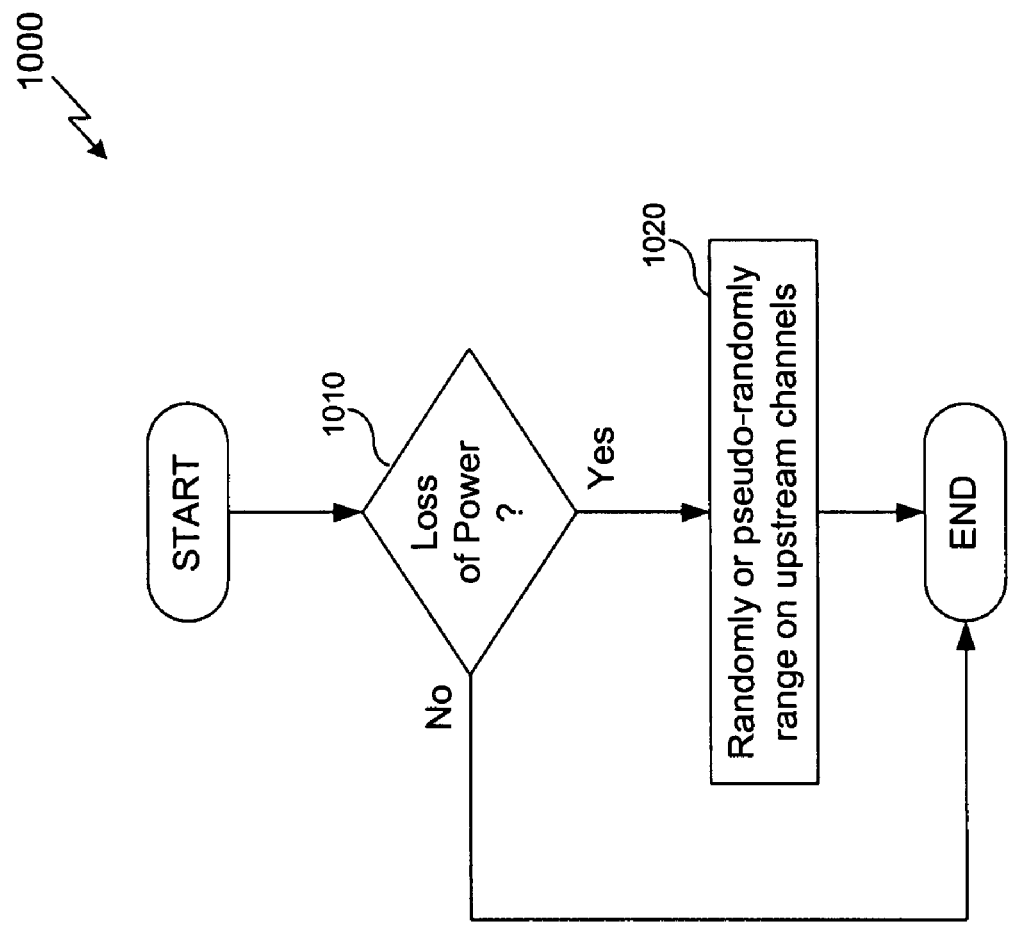
FIG. 10 illustrates a flow chart of a method for ranging on upstream channels according to an embodiment of the present invention.

FIGS. 8, 9, and 10 illustrate flowcharts of methods according to embodiments of the present invention. The invention, however, is not limited to the description provided by the flowcharts 800, 900, or 1000. Rather, it will be apparent to persons skilled in the relevant art(s) from the teachings provided herein that other functional flows are within the scope and spirit of the present invention.

Flowcharts 800, 900, and 1000 will be described with continued reference to example communication system 100, 500, 600, or 700 described above in reference to FIG. 1, 5, 6, or 7, respectively. The invention, however, is not limited to these embodiments.

Referring to FIG. 8, a first CPE device, such as a cable modem 108*a*, is enabled at block 810 to range on first upstream channels 510*a-d* in response to a loss of power. A second CPE device, such as cable modem 108*e*, is enabled at block 820 to range on second upstream channels 510*e-g* in response to the loss of power. According to an embodiment, a CMTS 104 enables the first and second CPE devices.

The first or second upstream channels 510 can be associated with a particular group, service, or priority, to provide some examples. The first and/or second cable modems 108 can be enabled before or after the loss of power. According to an embodiment, the first and second cable modems 108 are configured by the headend 102 to be capable of ranging, after a loss of power, on the first and second upstream channels 510, respectively.

Referring to FIG. 9, a first CPE device and a second CPE device are assigned a first priority and a second priority, respectively, at block 910. The first and second CPE devices are configured at block 920 to range based on the first and second priorities.

According to an embodiment, a CPE device delays ranging based on the group 505, 605 or priority with which the CPE is associated. For example, if a cable modem 108 is not assigned the highest priority, the cable modem 108 can delay ranging until devices having the highest priority have ranged or until the cable modem 108 receives permission to range.

CPE devices can be configured to randomly or pseudo-randomly range on upstream channels 510 in response to a power outage. For example, a cable modem 108 can pseudo-randomly select which upstream channel 510 or time slot(s) it uses for ranging by generating a random value based on the MAC address of the cable modem 108.

Referring to FIG. 10, a determination is made at diamond 1010 as to whether a loss of power has occurred. If a loss of power has occurred, CPE devices randomly or pseudo-randomly range on upstream channels 510 at block 1020. If no loss of power is detected, for example, then block 1020 is bypassed. The CPE devices can be configured by the headend 102, for example, to randomly or pseudo-randomly range on the upstream channels 510. The headend 102 can configure the CPE devices to range on the upstream channels 510 based on the MAC addresses of the CPE devices, according to an embodiment.

CONCLUSION

Example embodiments of the methods, systems, and components of the present invention have been described herein.

As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed is:

1. A media access control (MAC) in a base station communicatively coupled to a plurality of uplink channels, comprising:
   first MAC logic configured to group a first subscriber station with a first acquisition group of subscriber stations logically assigned to range on a first group of uplink channels selected from the plurality of uplink channels in response to a loss of power; and
   second MAC logic configured to group a second subscriber station with a second acquisition group of subscriber stations logically assigned to range on a second group of uplink channels selected from the plurality of uplink channels in response to the loss of power,
   wherein the first group of uplink channels comprise different uplink channels than the second group of uplink channels.

2. The MAC of claim 1, including:
   third MAC logic configured to direct the first subscriber station to range on a channel of the first group of uplink channels based on a MAC address of the first subscriber station; and
   fourth MAC logic configured to direct the second subscriber station to range on a channel of the second group of uplink channels based on a MAC address of the second subscriber station.

3. The MAC of claim 1, including:
   third MAC logic configured to randomly or pseudo-randomly assign the first subscriber station to a channel of the first group of uplink channels; and
   fourth MAC logic configured to randomly or pseudo-randomly assign the second subscriber station to a channel of the second group of uplink channels.

4. The MAC of claim 1, further comprising:
   third MAC logic configured to assign a first priority to the first subscriber station; and
   fourth MAC logic configured to assign a second priority to the second subscriber station.

5. The MAC of claim 4, wherein the first priority is based on a service provided by the first subscriber station, and the second priority is based on a service provided by the second subscriber station.

6. The MAC of claim 4, wherein the first MAC logic is configured to group the first subscriber station based on the first priority, and the second MAC logic is configured to group the second subscriber station based on the second priority.

7. The MAC of claim 4, wherein the second MAC logic is further configured to delay ranging of the second subscriber station based on the second priority.

8. A media access control (MAC) in a base station, comprising:
   first MAC logic configured to direct subscriber stations in a wireless system to randomly or pseudo-randomly range on uplink channels in response to a loss of power; and
   second MAC logic configured to prioritize the subscriber stations,
   wherein the first MAC logic is further configured to direct a first group of the subscriber stations to randomly or pseudo-randomly range on a first group of the uplink channels based on a first priority and to configure a second group of the subscriber stations to randomly or pseudo-randomly range on a second group of the uplink channels based on a second priority,
   wherein the first group of uplink channels comprise different uplink channels than the second group of uplink channels.

9. A method for reducing contention between subscriber stations during ranging on a plurality of uplink channels communicatively coupled to a base station, comprising:
   grouping a first subscriber station with a first acquisition group of subscriber stations logically assigned to range on a first group of uplink channels selected from the plurality of uplink channels in response to a loss of power; and
   grouping a second subscriber station with a second acquisition group of subscriber stations logically assigned to range on a second group of uplink channels selected from the plurality of uplink channels in response to the loss of power,
   wherein the first group of uplink channels comprise different uplink channels than the second group of uplink channels.

10. The method of claim 9, further comprising:
    directing the first subscriber station to range on a channel of the first group of uplink channels based on a MAC address of the first subscriber station; and
    directing the second subscriber station to range on a channel of the second group of uplink channels based on a MAC address of the second subscriber station.

11. The method of claim 9, further comprising:
    randomly or pseudo-randomly assigning the first subscriber station to a channel of the first group of uplink channels; and
    randomly or pseudo-randomly assigning the second subscriber station to a channel of the second group of uplink channels.

12. The method of claim 9, further comprising:
    assigning a first priority to the first subscriber station; and
    assigning a second priority to the second subscriber station.

13. The method of claim 12, wherein the first priority is based on a service provided by the first subscriber station, and the second priority is based on a service provided by the second subscriber station.

14. The method of claim 12, further comprising:
    grouping the first subscriber station based on the first priority, and grouping the second subscriber station based on the second priority.

15. The method of claim 12, further comprising:
    delaying ranging of the second subscriber station based on the second priority.

* * * * *

UNITED STATES PATENT AND TRADEMARK OFFICE
CERTIFICATE OF CORRECTION

| | | |
|---|---|---|
| PATENT NO. | : 8,041,351 B2 | |
| APPLICATION NO. | : 11/826127 | |
| DATED | : October 18, 2011 | |
| INVENTOR(S) | : Thomas J. Quigley et al. | |

It is certified that error appears in the above-identified patent and that said Letters Patent is hereby corrected as shown below:

Column 13, line 25, "the first group of uplink channels comprise" should read --the first group of uplink channels comprises--;

Column 14, line 14, "the first group of uplink channels comprise" should read --the first group of uplink channels comprises--;

Column 14, line 30, "the first group of uplink channels comprise" should read --the first group of uplink channels comprises--.

Signed and Sealed this
Sixth Day of December, 2011

David J. Kappos
*Director of the United States Patent and Trademark Office*